(12) United States Patent
Mullen et al.

(10) Patent No.: US 7,170,990 B2
(45) Date of Patent: Jan. 30, 2007

(54) AUTONOMOUS DISPATCHER METHOD AND APPARATUS

(75) Inventors: David C. Mullen, Newcastle, WA (US); Chad D. Hunter, Hudson, NH (US); Steven A. Frare, Bellevue, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 701 days.

(21) Appl. No.: 10/174,860

(22) Filed: Jun. 18, 2002

(65) Prior Publication Data

US 2003/0233402 A1 Dec. 18, 2003

(51) Int. Cl.
*H04M 3/00* (2006.01)

(52) U.S. Cl. .......................... 379/265.01; 379/265.02; 379/265.11; 379/265.12; 379/266.01; 379/309

(58) Field of Classification Search .......... 379/265.01, 379/265.02, 265.11, 265.12, 266.01, 309
See application file for complete search history.

(56) References Cited

U.S. PATENT DOCUMENTS

| | | | | |
|---|---|---|---|---|
| 5,206,903 A | * | 4/1993 | Kohler et al. ......... | 379/265.12 |
| 5,594,790 A | * | 1/1997 | Curreri et al. ......... | 379/266.07 |
| 5,822,400 A | * | 10/1998 | Smith ....................... | 379/32.02 |
| 5,828,747 A | * | 10/1998 | Fisher et al. ........... | 379/265.12 |
| 5,903,641 A | * | 5/1999 | Tonisson ................ | 379/265.12 |
| 5,963,635 A | * | 10/1999 | Szlam et al. ................ | 379/309 |
| 6,587,557 B1 | * | 7/2003 | Smith ..................... | 379/265.01 |
| 6,704,409 B1 | * | 3/2004 | Dilip et al. ............. | 379/265.02 |

OTHER PUBLICATIONS

Harkreader et al. (US 2003/0231757) waiting by not ready.*

* cited by examiner

*Primary Examiner*—Quynh H. Nguyen
(74) *Attorney, Agent, or Firm*—Sheridan Ross P.C.

(57) ABSTRACT

The present invention provides for the allocation of agents to channels associated with the contact center. In particular, the present invention provides a contact center that allows agents to be efficiently allocated among channels, without requiring centralized control applications. Instead, the contact center of the present invention provides centralized agent and channel information fields to permit coordination between independent channel and agent work station applications. The present invention allows channels to be added to a contact center without requiring extensive modifications to the various components of the contact center.

20 Claims, 6 Drawing Sheets

AUTONOMOUS DISPATCHER METHOD AND APPARATUS

FIELD OF THE INVENTION

The present invention relates to the dispatching of resources in connection with a contact center. In particular, the present invention is related to coordinating the allocation of resources among various media channels available in connection with a contact center.

BACKGROUND OF THE INVENTION

Contact centers, including call centers and multi-media contact centers, provide customer contact resources. In particular, contact centers coordinate the operations of human agents in initiating and responding to customer contacts. Contact centers increasingly utilize a variety of media, to maximize the efficiency of contact center operations and customer convenience. For example, contact centers may operate in connection with switched circuit voice telephony, packet data networks, and traditional mail communication channels. In order to utilize agents as efficiently as possible, it is necessary to coordinate the allocation of agent duties among the various media operable in connection with a contact center.

In addition to various media, the duties of agents deployed in connection with a contact center may be divided among various channels. For example, in connection with voice telephony as the media, a first channel may consist of incoming requests for service, and a second channel may comprise outgoing solicitations. As a further example, in connection with packet data networks as the media, a first channel may consist of e-mail communications, and a second channel may consist of Internet chat or instant messaging. Accordingly, the efficient utilization of contact center resources requires the allocation of agents between various channels, as well as between various media. Furthermore, tasks performed in connection with certain channels may require the complete attention of an agent, while multiple tasks in connection with one or more other channels may be handled simultaneously by an agent. Accordingly, the demands placed on agents by different channels varies.

One solution to the allocation of tasks to agents associated with a contact center allows the individual agents to determine what channels the agents' attentions are devoted to. The choices made by the individual agents in selecting channels can be informed by providing the agents with information regarding the current resource loads in connection with the various channels supported by the contact center. However, such systems tend to be inefficient. For example, agents are typically predisposed to select channels according to the personal preferences of the individual agents. In addition, requiring individual agents to decide where to turn their attention diverts the agents from their primary task, which is to service the various channels.

Still another approach to allocating resources in connection with a call center provides a centralized controller. Although centralized controllers are capable of providing an integrated system for allocating agents to various media channels, such systems are relatively inflexible. In particular, such systems require pervasive changes in order to accommodate new channels. Accordingly, modifications to such systems to operate in connection with new channels is a relatively expensive and time-consuming proposition. Furthermore, adapting newly developed or third party software for use in connection with an existing contact center having a centralized controller is difficult.

Still other systems provide automated blending of the workload assigned to each agent in connection with each agent's work station. However, such systems can result in the assignment of incompatible work tasks to an agent, as assignments to various channels are controlled independently of the agent's state with respect to other channels. Furthermore, such systems have required centralized control in order to resolve competing demands for resources among the channels. Accordingly, such systems do not solve the problems associated with accommodating new or additional channels in connection with a contact center.

SUMMARY OF THE INVENTION

The present invention is directed to solving these and other problems and disadvantages of the prior art. Generally, according to the present invention, an agent state and a transition field are maintained in a central agent control block in connection with a contact center. By making reference to the central agent control block, a particular channel can determine whether an agent is available to that channel. In addition, the use of central agent control block fields for conveying agent information allows the system to be readily adapted to use in connection with newly developed media and/or software and permits the allocation of agent resources, without the imposition of incompatible assignments on agents.

In accordance with a further embodiment of the present invention, a central channel status control block is established. Individual channels report status information to the channel status control block, thereby allowing other channels access to that information. The information recorded in the channel status control block by the channels may include an indication of a channel's need for agents, and the priority of that channel relative to other channels. The provision of the channel status control block allows the recruiting and dispatching of agents by individual channels to be coordinated with that of other channels. Furthermore, the provision of a channel status control block allows additional or revised channels to be integrated with the call center without requiring extensive revisions to other components of the call center.

In accordance with still another embodiment of the present invention, a call center servicing more than one channel is provided. The channels serviced by the call center may operate in connection with one or more media types. Also provided in connection with the call center are a plurality of agent work stations in connection with which at least a first agent may interface with one or more of the channels. In addition, the call center includes a centrally provided agent control block in connection with each agent work station. In particular, each agent work station reports status information to a corresponding agent control block. The agent control blocks are additionally accessible to each of the channels.

These and other advantages and features of the invention will become more apparent from the following discussion, particularly when taken together with the accompanying drawings.

DETAILED DESCRIPTION

The present invention is related to the coordination of activities within a contact center and to providing a contact center utilizing a system that is readily adapted to the incorporation of new or revised channels.

Figure 1:
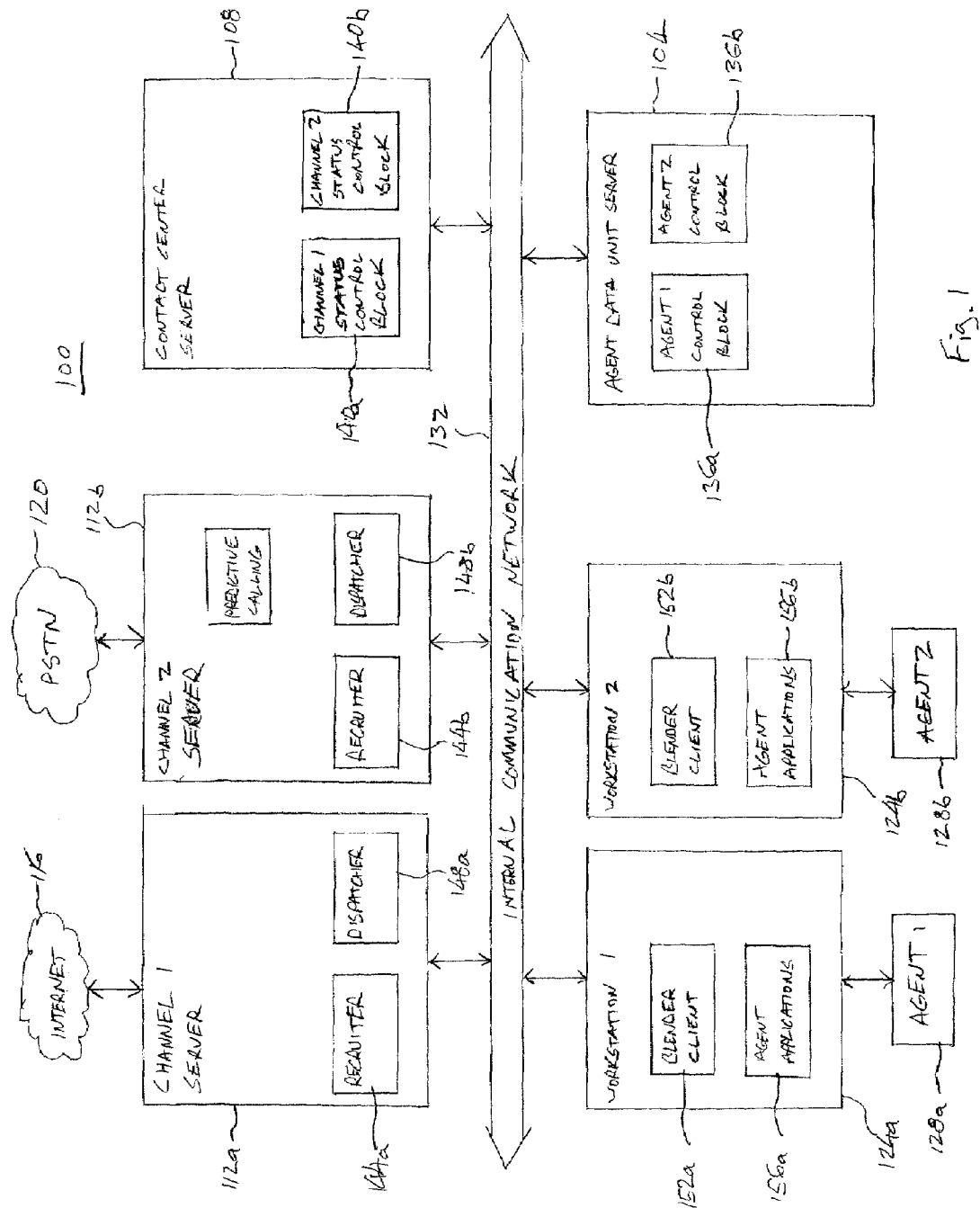
FIG. 1 is a block diagram depicting the components of a call center in accordance with an embodiment of the present invention.

With reference now to FIG. 1, a contact center 100 in accordance with an embodiment of the present invention is illustrated in block diagram form. In general, the contact center 100 includes an agent data unit server 104, and a contact center server 108. Although the agent data unit server 104 and the contact center server 108 are illustrated as different server units for purposes of aiding in the description of the present invention, it should be appreciated that the agent data unit server 104 and the contact center server 108 may be incorporated in a common server computer.

The contact center 100 additionally includes a number of channel servers 112. The channel servers 112 interconnect the contact center 100 to the outside world in connection with any of a variety of media. For example, the channel 1 server 112a illustrated in FIG. 1 is shown as being interconnected to the Internet 116. Accordingly, the channel 1 server 112a may comprise any channel capable of operating in connection with a media that comprises the Internet. Examples of such communication channels include e-mail, instant messaging, chat, remote video links, or voice over Internet protocol (VoIP) telephony. As a further example, the channel 2 server 112b is shown as being interconnected to the public switched telephony network (PSTN) 120. Accordingly, the channel 2 server 112b may incorporate a channel suitable for use in connection with media comprising the public switched telephony network. Examples of such channels include servicing incoming real time voice communications, facsimile communications, and performing outbound predictive dialing operations. Although shown as separate server computers in FIG. 1, it should be appreciated that the channel servers 112 may be implemented within a single computer. Furthermore, it should be appreciated that one or more of the channel servers 112 may be combined with one or both of the agent data unit server 104 and the contact center server 108.

The call center 100 additionally comprises a number of agent work stations 124. In general, each of the agent work stations 124 provides an interface for an associated agent 128 with other components of the contact center 100, including the associated channels 112 through or in associated with the channel servers. The agent 128 may comprise a human agent or some other resource, such as a computer implemented agent or a robotic agent.

The various servers 104, 108, 112 and work stations 124 associated with the contact center are interconnected to one another by an internal communication network 132. The internal communication network 132 may comprise one or more networks suitable for conveying communications between the various components. Accordingly, the internal communication network 132 may comprise a computer network, including a packet data network, such as a local area network, a wide area network, or a combination of computer network types. In general, any communication network suitable for passing information between interconnected servers 104, 108, 112 and work stations 124 may comprise the internal communication network 132.

The agent data unit server 104 generally provides a central repository for information concerning the agent work stations 124 and/or agents 128 associated with the contact center 100. This information may be maintained in agent control blocks 136 maintained for each agent work station 124 and/or agent 128. As will be described in greater detail below, components of the contact center 100 in communication with the agent data unit server 104 may use information stored in the agent control blocks 136 in determining aspects of the operation of those components. In addition, certain of the components associated with the contact center 100 may report status information to other of the components by altering fields maintained within the agent control blocks 136.

The contact center server 108 generally serves as a central repository for information related to the channels 112 associated with the contact center 100. For example, the contact center server 108 may maintain a channel status control block 140 in connection with the channels 112 associated with the contact center 100. The information maintained in the channel status control block 140 may be utilized to coordinate the activities of the channel servers 112. In particular, a channel (e.g., a channel associated with the channel 1 server 112a) may report information related to that channel to the channel status control block 140. Other channels (for example, channel 2 112b) may obtain information related to the status of the other channel or channels (e.g., channel 1 112a) by reading such information from fields maintained in the channel status control block 140. As an alternative to a single status control block 140 containing status information related to each channel, a separate channel status control block may be provided for each channel associated with the contact center 100. For example, a first channel status control block 140a may be provided in connection with the channel 1 server 112a and a second channel status control block 140b may be provided in connection with the channel 2 server 112b.

In addition to providing an interface between other components of the contact center 100 and the various media channels, as will be described in greater detail below, the channel servers 112 operate to obtain and release agents 128 as required to satisfy work loads in connection with the channel. Accordingly, the channel servers 112 each comprise a recruiter module 144 and a dispatcher module 148.

The work stations 124 each comprise a blender client 152. As will be described in greater detail below, the blender client 152 generally functions to report a current agent work station 124 status to the corresponding agent control block 136 maintained as part of the agent data unit server 104. In addition, the blender client 152 functions to prepare the associated agent work station 124 to transition to a different channel in response to a request for transfer indicated by a channel server 112 in the agent control block 136. Each agent work station 124 may also comprise agent applications 156. The agent applications 156 generally include applications allowing the human agent 128 associated with a work station 124 to communicate and otherwise initiate or respond to customer contacts over the channels. Examples of applications 156 that may be provided include electronic mail programs, instant messaging programs, programs implementing soft telephones, video telephones, and programs controlling the operation of hard telephones associated with a workstation 124.

Figure 2:
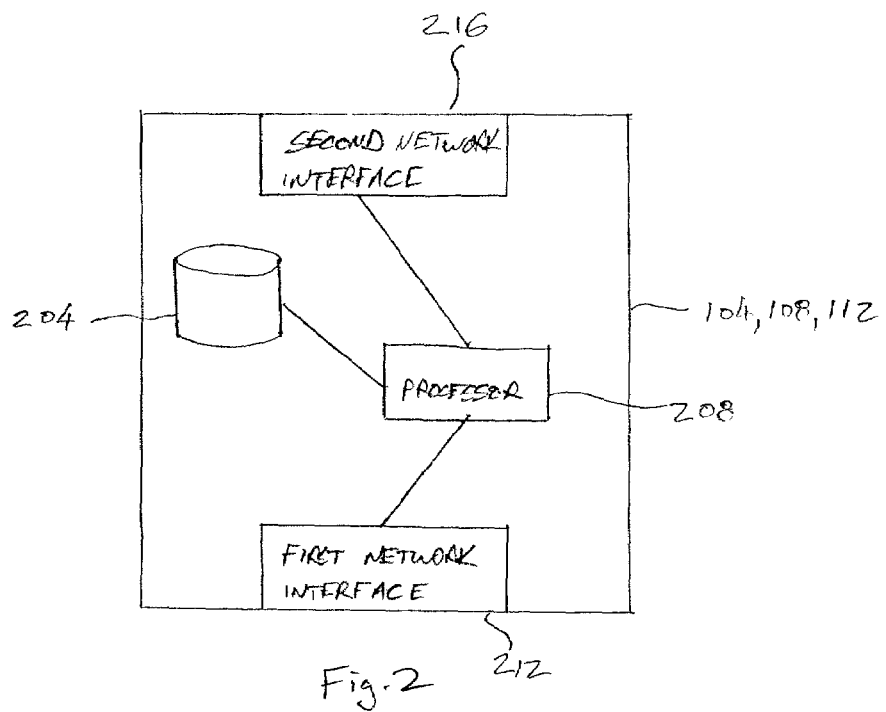
FIG. 2 is a block diagram depicting a server in accordance with an embodiment of the present invention.

With reference now to FIG. 2, a block diagram generally depicting the major functional components of a server 104, 108, 112 associated with a contact center 100 in accordance with the present invention is illustrated. In general, the server 104, 108, 112 comprises data storage 204. The data storage 204 may comprise one or more components capable of maintaining information for use in connection with the operation of the server 104, 108, 112. For example, the data storage 204 may comprise a hard disk drive, an optical drive, a floppy disk drive, magnetic tape devices, or solid state memory. Furthermore, it should be appreciated that the data storage 204 may comprise components capable of maintaining analog information, such as voice announcements, in addition to digital data.

Each server 104, 108, 112 additionally includes a processor 208. The processor 208 may comprise a programmable processor such as a Pentium™ or Power™ PC processor. Alternatively or in addition, the processor 208 may comprise a controller. In general, the processor 208 runs applications, which may be stored as programs in the data storage 204, for controlling the operation of the server 104, 108, 112.

Each server 104, 108, 112 additionally includes a first network interface 212. The first network interface 212 serves to interconnect the server 104, 108, 112 to the internal communication network 132 of the contact center 100. For example, where the internal communication network 132 comprises an Ethernet network at the point of contact between the server 104, 108, 112 and the internal communication network 132, the first network interface 212 comprises an Ethernet network interface.

The server 104, 108, 112 may additionally include a second network interface 216. In general, a second network interface 216 is provided where connectivity to a communication network using a different system or protocol than the first network interface 212 is required or desired. For instance, a second network interface 216 may be provided with channel servers 112 that interconnect the contact center 100 to external media. For instance, the channel 1 server 112a illustrated in FIG. 1 is shown as being interconnected to the Internet 116. Accordingly, the channel 1 server 112a may comprise a TCP/IP network interface 216 that differs from the first network interface 212 associated with the channel 1 server 112a. As a further example, the channel 2 server 112b illustrated in FIG. 1 is shown interconnected to the public switched telephony network (PSTN) 120. Accordingly, the channel 2 server 112b may comprise a tip-ring interface as the second network interface 216, to allow the channel server 2 112b to communicate over switched circuit communication lines. Still another example of a second network interface 216 is a computer telephony integration (CTI) interface.

From the above description, it should be appreciated that the servers 104, 108, 112 used in connection with the present invention may be adapted to provide functions and hardware necessary or desirable in connection with the performance of their intended function. Furthermore, it should be appreciated that the servers 104, 108, 112 can be implemented using general purpose computers configured for operation in connection with the contact center 100, or special purpose communication servers. In addition, it should be appreciated that, although the various servers 104, 108, 112 are illustrated by different functional blocks in FIG. 1, the contact center 100 may incorporate servers 104, 108, 112 that are not physically distinct from one another. For example, the agent data unit server 104 and the contact center server 108 may be implemented using a common general purpose server programmed to provide the functions of the agent data unit server 104 and the contact center server 108. As a further example, the channel 1 server 112a and the channel 2 server 112b may share a common, suitably programmed communication server. Where, as in the example given above, the channel 1 server 112a and the channel 2 server 112b are interconnected to different media types, an additional network interface may be provided. That is, a second network interface 216 may be provided for TCP/IP communications, and a third network interface may be provided for tip and ring communications.

According to a further embodiment of the present invention, a channel server 112 may comprise a single network interface 212 where customer contact may be maintained through the internal communication network 132, for example via a server (such as the contact center server 108) that interconnects the internal communication network 132 to the Internet. As yet another example, the first channel 212 may be used in connection with VoIP telephony, and a second network interface 216 may be provided that is utilized in connection with tip-ring communications. As a further example, the servers 104, 108, 112 may all be implemented in a single physical computer.

Figure 3:
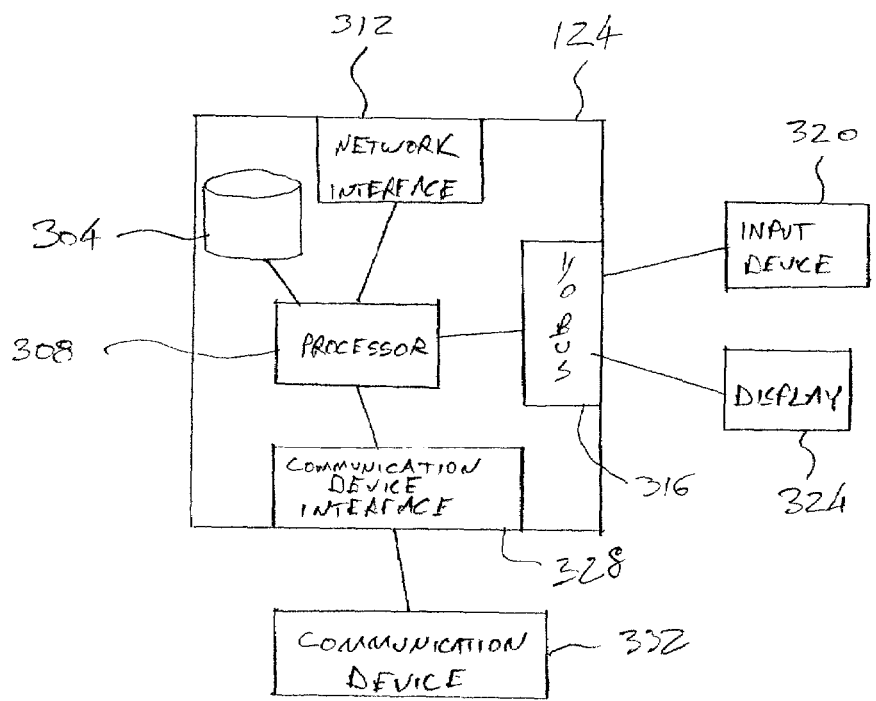
FIG. 3 is a block diagram depicting a work station in accordance with an embodiment of the present invention.

With reference now to FIG. 3, a work station 124 in accordance with an embodiment of the present invention is illustrated. In general, the work station 124 comprises a data storage device 304, a processor 308 and a network interface 312. The date storage device 304 may comprise one or more devices suitable for maintaining digital and/or analog information. For example, the data storage device 304 may comprise a hard disk drive, optical drive, floppy disk drive, tape drive, or solid state memory. The processor 308 may comprise a general purpose programmable processor, such as a Pentium™ or Power PC™ processor or a controller. In general, the processor 308 functions to run applications stored in the data storage 304 and used in connection with the operation of the work station 124. The network interface 312 is provided for interconnecting the work station 124 to the internal communication network 132. Accordingly, the network interface 312 may comprise a TCP/IP interface, such as an ethernet interface.

An input/output or peripheral bus 316 may also be provided as part of the workstation 124 for interconnecting the work station 124 to a user input device 320 and/or a display 324. The user input device 320 may comprise one or more devices for allowing an agent 128 to interface with the work station 124. For example, the input device 320 may comprise a keyboard or pointing device. The display 324 may provide an agent 128 with visual output regarding the status of the work station 124 and in particular regarding tasks assigned to the agent 128 in connection with a channel. Accordingly, the display 324 may comprise a cathode ray tube or liquid crystal type display. Furthermore, as can be appreciated, input and output functions may be combined, for example in connection with a touch screen type display.

The work station 124 may additionally comprise a communication device interface 328 for interconnecting the work station 124 to a communication device 332. For instance, the communication device interface 328 may comprise a digital or analog audio interface, and the communication device 332 may comprise a telephone handset. Accordingly, as can be appreciated, the work station 124 may allow an agent 128 to communicate over channels comprising textual communications, such as Internet chat, using the input device 320 and display 324. In addition, the communication device 332 may allow the agent 128 to communicate over channels comprising the public switched telephony network (e.g., in the example system of FIG. 1 an agent 128 can communicate over the PSTN 120 through the channel 2 server 112b).

Figure 4:
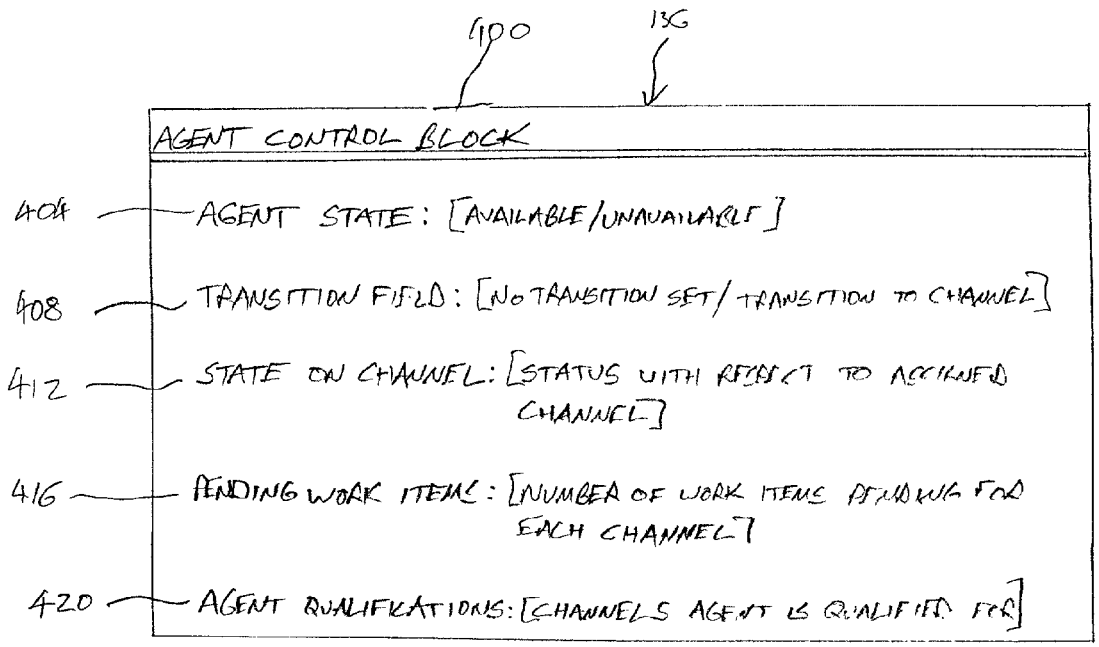
FIG. 4 is a table illustrating the various fields maintained as part of an agent control block in accordance with an embodiment of the present invention.

With reference now to FIG. 4, a table 400 illustrating various data fields maintained in connection with an agent control block 136 according to an embodiment of the present invention is illustrated. In general, the table 400 may include an agent state field 404. The agent state field 404 may indicate whether an agent is available or unavailable for transfer to a different channel. The value held by the agent state field 404 may be controlled by the agent work station 124 associated with the particular agent control block 136 with which the particular table 400 is associated. A transition field 408 may be provided for indicating whether an agent 128 is designated for a transition to a new channel. The value held by the transition field 408 may be controlled by the agent work station 124. In addition, a field indicating the agent's state on a channel 412 may be provided. In general, the field regarding the agent's state on a channel 412 indicates whether an agent 128 is, for example, on a call, idle, or wrapping up a client contact, for example, by updating client information maintained in a database. Accordingly, the field indicating the agent's state on an assigned channel 412 can indicate whether additional, concurrent work may be assigned to the agent 128. Multiple fields 412 indicating an agent's state on a channel may be provided where the simultaneous assignment of an agent 128 to multiple channels is supported.

The agent control block table 400 may additionally include a pending work items field 416, for indicating the number of work items pending on each channel with respect to the agent 128. Accordingly, work load information related to an agent 128 may be obtained from the agent control block tables 140. Multiple fields 416 for indicating pending work items may be provided in connection with a contact center 100 in which the simultaneous assignment of agents 128 to multiple channels is supported. In addition, the agent control block table 400 may include one or more qualification fields 420. The qualification field or fields 140 may, for example, indicate the channels (i.e. the types of work) that the agent is qualified to work on, and/or the agent's particular qualifications with respect to a channel.

Figure 5:
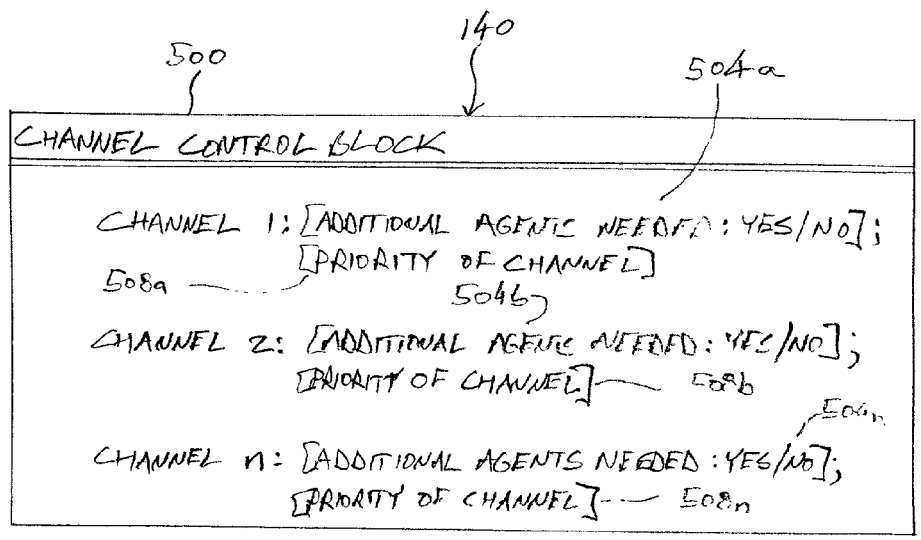
FIG. 5 is a table illustrating the various fields maintained as part of a channel control block in accordance of an embodiment of the present invention.

With reference now to FIG. 5, a channel status control block 140 in accordance with the present invention 140 may comprise a table 500 for storing various information regarding the status of the channels 112. Fields related to the channels may include fields specifying whether additional agents are needed 504, and a field regarding the priority of the channel 508 relative to the other channels. In an embodiment in which a separate channel status control block 140 is provided for each channel associated with the contact center, only information related to an associated channel is maintained in each status control block 140. In such an embodiment, a channel server 112 checks the status control block 140 associated with each of the other channels to determine, for example, whether any other channels require additional agents.

Figure 6:
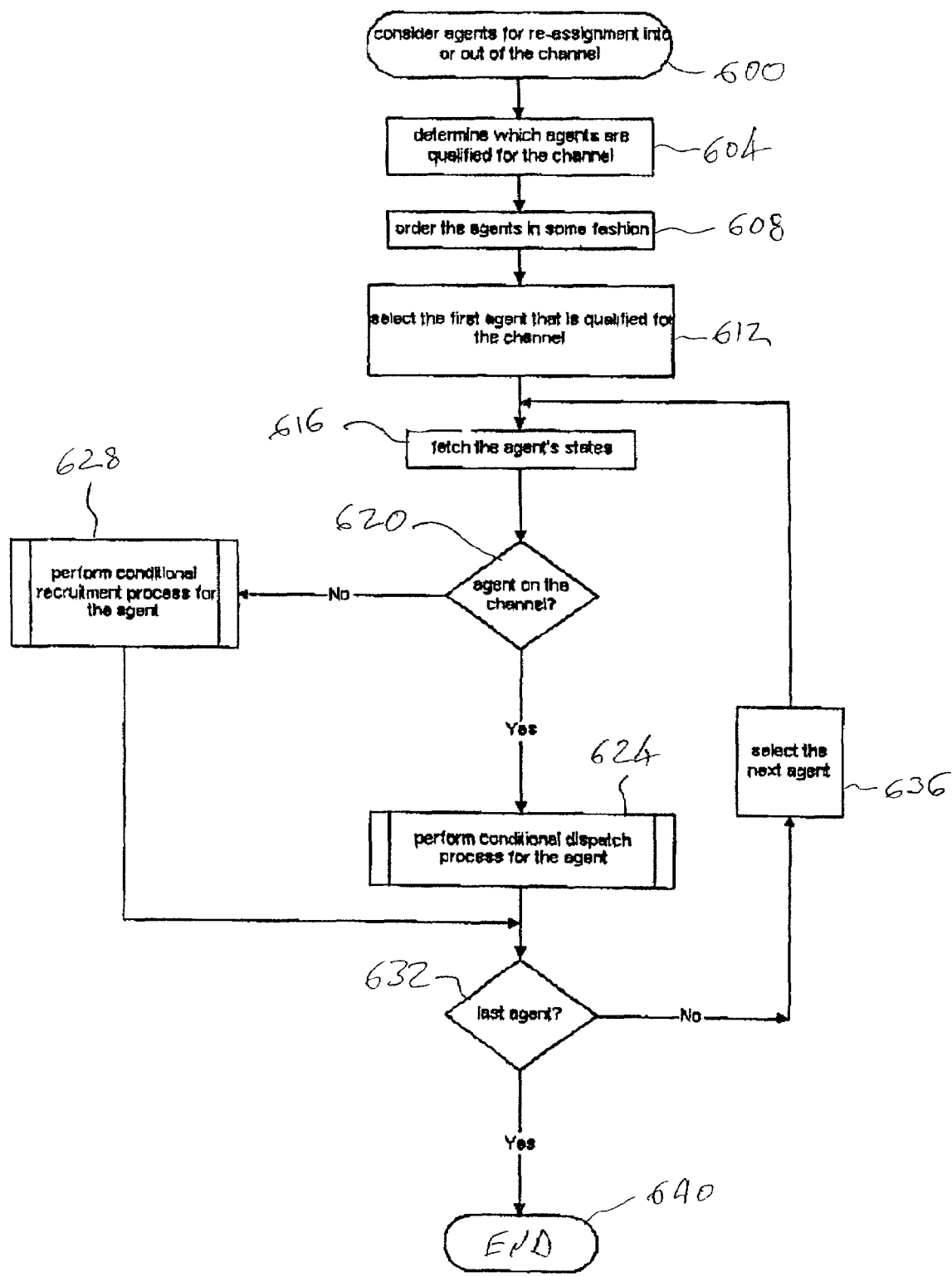
FIG. 6 is a flowchart illustrating a channel agent recruiting and dispatching process in accordance with an embodiment of the present invention.

With reference now to FIG. 6, a flowchart depicting a process for recruiting or dispatching agents in connection with a channel followed by a channel server 112 is illustrated. Initially, at step 600, agents 128 are considered for reassignment into or out of the channel. At step 604, the channel server 112 determines which agents 128 are qualified for operations in connection with the channel. The capabilities of individual agents 128 may be indicated in qualification fields 420 provided as part of the agent control blocks 136. Alternatively, or in addition, this determination can be made by referencing a table indicating the capabilities of various agents 128 maintained in the agent data unit server 104. At step 608, the agents 128 are ordered according to an ordering scheme. For instance, agents 128 may be ordered according to the time since they were last assigned to work in connection with the channel, to provide the agents 128 with a variety of work. The first agent 128 qualified for the channel 112 is then selected (step 612).

At step 616, the channel server 112 fetches the states of the selected agent 128 from the agent control block 136 associated with that agent 128. In particular, the value held by the agent state field 404 of the table 400 maintained in the agent control block 136 for the selected agent 128 is referenced. At step 620, a determination is made as to whether the selected agent 128 is already on the channel. If the agent is already on the channel, the channel server 112 may perform a conditional dispatch process for the agent 128 (step 624). If the agent 128 is not assigned to the channel, the channel server 112 performs a conditional recruitment process for the agent 128 (step 628). After performing either the conditional dispatch process or the conditional recruitment process, the channel server 112 determines whether the agent 128 previously conditionally dispatched or recruited is the last agent 128 qualified for the channel (step 632). If additional agents 128 qualified for the channel remain to be conditionally dispatched or recruited, the next agent 128 is selected (step 636), and steps 616, 620 and either 624 or 628 are performed with respect to the next agent 128. If it is determined that the last agent 128 has been conditionally dispatched or recruited, the process for considering agents 128 for reassignment ends (step 640). A new process for considering agents 128 for reassignment may then begin immediately, after a period of delay, or after some triggering event, such as a change in traffic on a channel.

Figure 7:
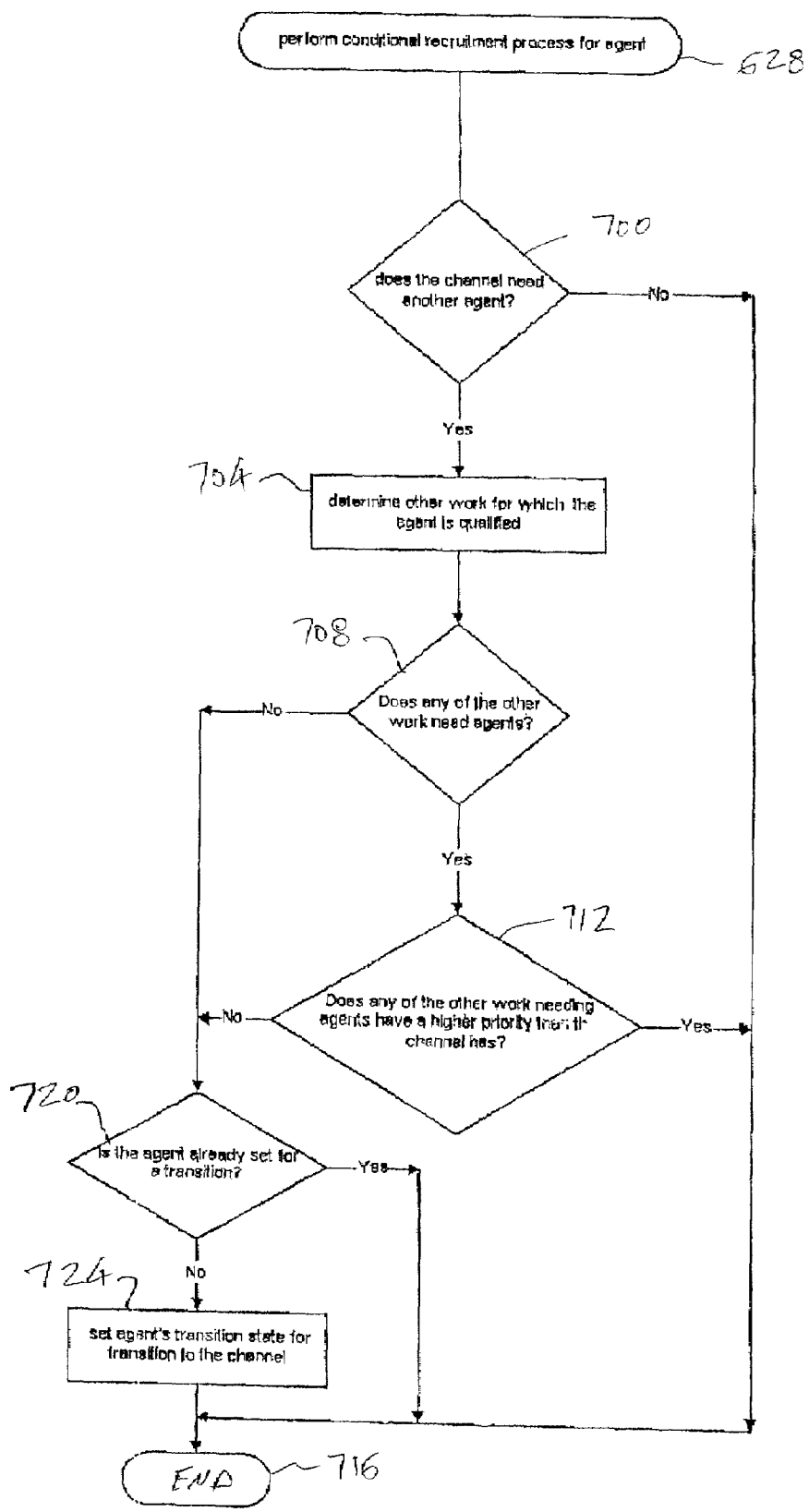
FIG. 7 is a flowchart illustrating a process for the conditional recruitment of an agent by a channel in accordance with an embodiment of the present invention.

In FIG. 7, the steps performed as a part of the conditional recruitment process 628 are shown. In particular, at step 700, a determination is made as to whether the channel associated with the channel server 112 needs another agent 128. If another agent 128 is required, a check is made to determine what other work (i.e., what other channels) the selected agent 128 is qualified for (step 704). This may be performed by checking the qualification field 420 maintained in the agent control block 400 for the selected agent 128. Next, at step 708, a determination is made as to whether any of the other work (i.e., the other channels) require agents 128. This can be performed by checking the field specifying whether additional agents are required 504 that is maintained for each channel in the channel status control block 140. If any other channels for which the selected agent is qualified require agents 128, a determination is made as to whether any of those other channels requiring agents 128 has a higher priority than the channel associated with the server 112 has (step 712). The priority of other channels can be ascertained by assigned priority value for each channel. The priority values are maintained in the channel priority field 508 for each channel as part of the channel status control block 140. If any of the other channels has a higher priority, the conditional recruitment process ends (step 716), and the channel server 112 returns to step 632 (see FIG. 6).

If no other channel requiring agents has a higher priority than the channel associated with the channel server 112, or if none of the other channels requires an agent 128, a determination is made as to whether the agent 128 under consideration is already scheduled for a transition to another channel (step 720). In particular, the channel server 112 makes reference to the transition field 408 maintained in the agent control block 136 for the agent 128 under consideration. If the agent 128 under consideration has already been scheduled for a transition to another channel, the conditional recruitment process ends (step 716) and the server 112 returns to step 632 (see FIG. 6). If the agent 128 under consideration has not been scheduled for a transition to another channel, the agent's 128 transition state is set for transition to the channel associated with the channel server 112 (step 724).

In general, when an agent 128 is recruited by a channel, the agent 128 will begin accepting work in connection with that channel after work pending on previously assigned channels has been completed. An agent work station 124 will signal that it is ready to accept work from a channel by indicating in the agent's state field 404 that the agent 128 is available. Accordingly, the agent work station 124 controls the value held by the transition field 408. Furthermore, as can be appreciated by the description of the recruitment process, the channel server 112 seeking to recruit the services of an agent 128 for work on an associated channel may control the value held by the transition field 408 where no transition is pending.

Figure 8:
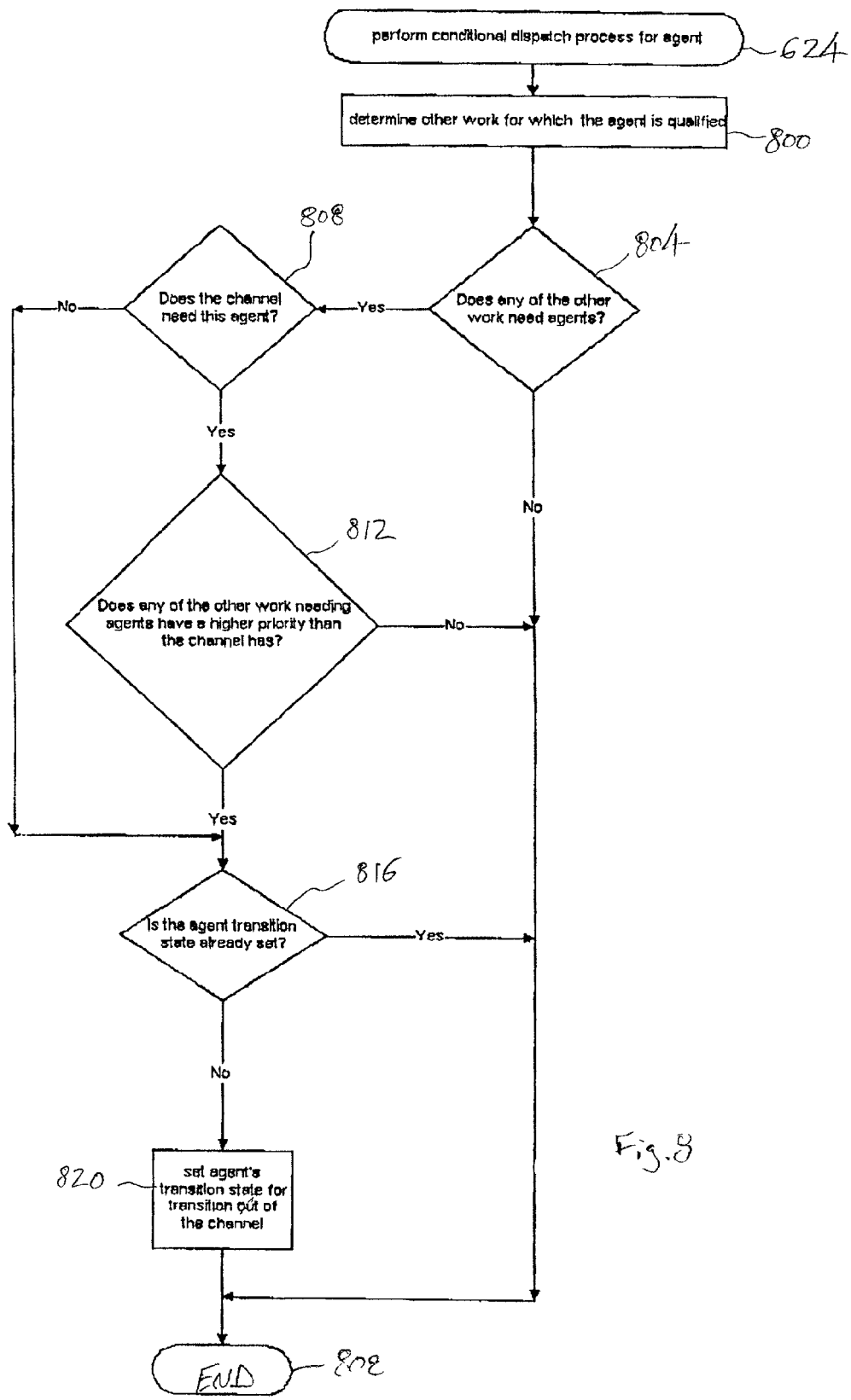
FIG. 8 is a flowchart illustrating a process for the conditional dispatch of an agent by a channel in accordance with an embodiment of the present invention.

With reference now to FIG. 8, a flowchart depicting the conditional dispatch process for an agent 624 followed by a channel server 112 is illustrated. Initially, at step 800, a check is made to determine what other types of work (i.e., what other channels) the agent 128 under consideration is qualified for by checking the agent qualifications field 420 for the agent 128. Next, at step 804, a determination is made as to whether any of the other work requires agents 128 by checking the field specifying whether additional agents 128 are needed 504 for each channel associated with the control center 100 for which the agent is qualified. If none of the other work requires agents 128, the conditional dispatch process ends (step 808). The agent 128 under consideration thus will continue to be assigned work by the server 112 performing the conditional dispatch process. The server 112 then proceeds to step 632 (see FIG. 6).

If at step 804 it is determined that other work needs agents 128, a determination is made as to whether the channel associated with the channel server 112 performing the conditional dispatch process requires this particular agent 128 (step 808). If the agent 128 needs to be retained by the channel (for example, the agent 128 has pending work items, as shown in the pending work item field 416 of the agent control block 136 for that agent 128, that prohibits reassignment, or service goals for the channel server 112 are in jeopardy without benefit of all of the currently assigned agents 128), a determination is made as to whether any of the other work requiring agents 128 has a higher priority than the channel associated with the channel server 112 (step 812). If none of the other channels has a higher priority, the conditional dispatch process ends (step 808) and the channel server 112 returns to step 632 (see FIG. 6).

If the channel does not need the agent 128 under consideration, or if other work requiring agents 128 has a higher priority, a determination is made as to whether a transition to another channel has already been set for the agent 128 under consideration (step 816). If a transition for the agent 128 has already been set, the conditional dispatch process ends (step 808), and the channel server 112 continues to step 632 (see FIG. 6). If the agent transition state has not already been set, the transition state is set by the channel server 112 to indicate transition out of the channel (i.e. the agent 128 is released by the channel server 112 performing the conditional dispatch process pending the completion of tasks requiring the retention of the agent 128) (step 820). The conditional dispatch process then ends (step 808) and the channel server 112 continues to step 632 (see FIG. 6).

As can be appreciated by the above description, the channel servers 112 cooperate with one another to distribute agents 128 to channels that require agents 128. In particular, the channel servers 112 operate to recruit agents 128 when an associated channel has work to be completed, and that channel has a sufficiently high priority to recruit agents 128 given the work requirements of other channels. In addition, the channel servers 112 operate to release agents 128 to other channels if work having a higher priority arises on other channels.

In addition, it can be appreciated that the cooperation between channel servers 112 to distribute agents 128 between the various channels is performed in the absence of a central control application. Instead, a central control block 140 is maintained for communicating the needs of individual channels for agents 128, and the relative priorities of the channels. Accordingly, additional channels can be integrated into a contact center 100 simply by providing space within the channel control block 140 and by assigning a priority to the newly added channel. In particular, additional channels can be added without requiring the modification or rewriting of a central control application.

The allocation of work to agents 128 associated with work stations 124 can also be performed in the absence of a central work allocation application. Instead, agent control blocks 136 are maintained centrally, to allow channel servers 112 to access status information regarding agents 128. Accordingly, new or additional channels can be associated with a contact center 100 without requiring features associated with the work stations 124 to be modified. In particular, a newly added channel server 112 need only be capable of accessing the agent control blocks 136 maintained within the agent data unit server 104.

The present invention also ensures that agents 128 are not provided with incompatible work simultaneously. In particular, a channel can be precluded from distributing work to an agent 128 until the agent 128 has completed the work items previously distributed to the agent 128 by another channel.

The foregoing discussion of the invention has been presented for purposes of illustration and description. Further, the description is not intended to limit the invention to the form disclosed herein. Consequently, variations and modifications commensurate with the above teachings within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular use or application of the invention. It is intended that the appended claims be construed to include the alternative embodiments to the extent permitted by the prior art.

What is claims is:

1. A method for assigning agents to tasks in a contact center, comprising:

determining at a first channel server associated with a first communication medium comprising a first channel a need for an agent, wherein said contact center includes at least said first channel server and a second channel server associated with a second communication medium comprising a second channel;

in response to said step of determining at a first channel a need for an agent, querying by said first channel server associated with said first channel a central agent control block to determine which of said at least first and second channels a first agent is qualified for;

in response to determining that said first agent is qualified for said first channel, determining whether said central agent control block contains an indication that said agent is set to transition to one of said channels;

in response to determining that no transition to a channel is set for said first agent, setting in said central agent control block a transition field value of said first agent maintained in said central agent control block equal to said first channel;

detecting in a first workstation associated with said first agent that said transition field value is set equal to said first channel;

completing tasks pending with respect to said first workstation; and assigning work from said first channel to said first agent.

2. The method of claim 1, further comprising:
setting an agent state on channel in said central agent control block corresponding to said first agent equal to said first channel.

3. The method of claim 1, further comprising:
selecting an agent qualified to perform tasks in association with said first channel; and
determining that said first agent is qualified to perform tasks in association with said first channel.

4. The method of claim 3, further comprising:
determining that said first agent is qualified to perform tasks in association with a second channel; and
determining that said first channel has a greater priority than said second channel.

5. The method of claim 1, further comprising:
determining that said first channel no longer requires said first agent; and
setting a transition field of said first agent in said central agent control block equal to a value other than said first channel.

6. The method of claim 5, further comprising:
completing tasks assigned to said first agent in connection with said first channel; and
setting an agent state in said agent control block equal to available.

7. The method of claim 1, further comprising:
integrating a second channel with said contact center, said step of integrating comprising:
assigning a priority of said second channel relative to said first channel; and
providing an indication of said priority assigned to said second channel in a channel control block.

8. The method of claim 1, further comprising:
integrating a second agent with said contact center, said step of integrating comprising:
creating a central agent control block associated with said second agent.

9. A computer readable medium comprising instructions to perform the steps of claim 1.

10. A contact center, comprising:
agent workstation means;
first channel server means including means for recruiting an agent to a first channel;
means for maintaining channel status information;
second channel server means including means for recruiting an agent to a second channel, wherein said means for recruiting an agent to a first channel is in communication with said means for recruiting an agent to a second channel through said means for maintaining channel status information;
means for indicating an availabilty of an agent, comprising:
means for indicating a scheduled transition, wherein said means for recruiting is capable of changing a value held by said means for indicating a scheduled transition; and
means for indicating an agent state, wherein said agent work station means control a value held by saiod means for idicating an agent state;
communication network means, wherein said agent work station means is interconnected to said first and second means for recruiting, at least through said means for indicating an availability of an agent, and wherein said means for recruiting an agent to a first channel and said means for recruiting an agent to a second channel are in communication with said means for maintaining channel status information.

11. The contact center of claim 10, further comprising:
a first communication channel means.

12. The contact center of claim 10, further comprising:
means for dispatching an agent from a first channel.

13. The contact center of claim 10, further comprising: a second communication channel means.

14. The contact center of claim 13, wherein said first communication channel means comprises a first communication media, and wherein said second communication channel comprises a second communication media.

15. The contact center of claim 14, wherein said first communication media comprises the public switched telephony network, and wherein said second communication media comprises the Internet.

16. A contact center system, comprising:
a first channel server associated with a first communication medium, including:
a recruiter module; and
a dispatcher module;
a second channel server associated with a second communication medium, including;
a recruiter module; and
a dispatcher module;
a first agent workstation interconnected to said first communication medium through said first communication server and to said second communication medium through said second communication server;
a contact center server, wherein status information regarding said first channel server reported to said contact server by said first channel server and status information regarding said second channel server reported to said contact center server by said second channel server is maintained;
an agent data unit server, wherein status information regarding said first agent workstation reported to said agent data unit server by said first agent workstation is maintained, and wherein said status information regarding said first agent workstation includes information related to a scheduled agent transition;

a communication network interconnecting said contact center server, said agent data unit server, said first channel server, said second channel server, and said first agent workstation, wherein an agent available to said first channel server and said second channel server is at least partially determined by said agent workstation information held by said agent data unit server.

17. The contact center system of claim 16, further comprising:

a second agent workstation, wherein said contact center server additionally maintains status information regarding said second channel server, and wherein said agent data unit server additionally maintains status information regarding said second agent workstation.

18. The contact center system of claim 16, wherein operation of said first channel server and said second channel server is coordinated by said status information held by said contact center server.

19. The contact center system of claim 18, wherein at least a first value comprising said agent workstation information is controlled by a corresponding agent workstation.

20. The contact center system of claim 19, wherein at least a second value comprising said agent workstation information is controlled by a channel server.

* * * * *